(12) United States Patent
Chun et al.

(10) Patent No.: US 7,674,545 B2
(45) Date of Patent: Mar. 9, 2010

(54) ELECTROKINETIC MICRO POWER CELL USING MICROFLUIDIC-CHIP WITH MULTI-CHANNEL TYPE

(75) Inventors: Myung-Suk Chun, Seoul (KR); Nak Won Choi, Seoul (KR)

(73) Assignee: Korea Institute of Science & Technology, Seoul (KR)

( * ) Notice: Subject to any disclaimer, the term of this patent is extended or adjusted under 35 U.S.C. 154(b) by 1487 days.

(21) Appl. No.: 10/969,292

(22) Filed: Oct. 19, 2004

(65) Prior Publication Data

US 2006/0083661 A1 Apr. 20, 2006

(51) Int. Cl.
*H01M 2/00* (2006.01)
*B01L 3/02* (2006.01)

(52) U.S. Cl. ......................... 429/34; 422/100
(58) Field of Classification Search .................. 422/100
See application file for complete search history.

(56) References Cited

U.S. PATENT DOCUMENTS

| | | | | |
|---|---|---|---|---|
| 5,376,472 | A * | 12/1994 | Hartvigsen et al. | 429/32 |
| 5,571,410 | A * | 11/1996 | Swedberg et al. | 210/198.2 |
| 6,558,960 | B1 * | 5/2003 | Parce et al. | 436/519 |
| 6,727,099 | B2 | 4/2004 | Chun et al. | |
| 7,247,274 | B1 * | 7/2007 | Chow | 422/100 |
| 2004/0188254 | A1 * | 9/2004 | Spaid | 204/451 |

OTHER PUBLICATIONS

C.L. Rice, R. Whitehead, "Electrokinetic flow in a narrow cylindrical capillary", *J. Phys. Chem.*, 69, 4017-4024, 1965.
S. Levine, J.R. Marriott, G. Neale, N. Epstein, "Theory of electrokinetic flow in fine cylindrical capillaries at high zeta-potentials", *J. Colloid Interface Sci.*, 52, 136-149, 1975.
C. Causserand, M. Nyström, P. Aimar, "Study of streaming potentials of clean and fouled ultrafiltration membranes", *J. Membr. Sci.* 88, 211-222, 1994.
A. Szymczyk, B. Aoubiza, P. Fievet, J. Pagetti, "Electrokinetic phenomena in homogeneous cylindrical pores", *J. Colloid Interface Sci.* 216, 285-296, 1999.
J.H. Sung, M.-S. Chun, H.J. Choi, "On the behavior of electrokinetic streaming potential during protein filtration with fully and partially retentive nanopores", *J. Colloid Interface Sci.* 264, 195-202, 2003.
J. Yang, F.L. Larry, W. Kostiuk, D.Y. Kwok, "Electrokinetic microchannel battery by means of electrokinetic and microfluidic phenomena", *J. Micromech. Microeng.*, 13, 963-970, 2003.
S. Shoji, M. Esashi, "Microflow devices and systems" *J. Micromech. Microeng.*, 4, 157-171, 1994.

(Continued)

*Primary Examiner*—Patrick Ryan
*Assistant Examiner*—Muhammad Siddiquee
(74) *Attorney, Agent, or Firm*—Merchant & Gould P.C.

(57) ABSTRACT

The invention relates to a new micro power cell applying the microfluidic-chip with multi-channel type. The streaming potential is the main thrust, which is created by Helmholtz-Smoluchowski's electrokinetic principle when electrolytic solution flows through a microchannel. The microfluidic-chip comprises an inflow port, a distributor, a multi-channel, a collector, an outflow port, and a pair of electrodes. The present invention could be applied to a new power source of clean energy.

12 Claims, 13 Drawing Sheets

OTHER PUBLICATIONS

B.-H. Jo, L.M. van Lerberghe, K.M. Motsegood, D.J. Beebe, "Three-dimensional micro-channel fabrication in polydimethylsiloxane (PDMS) elastomer", *J. Microelectromech. Sys.*, 9(1), 76-81, 2000.

J.C. McDonald, G.M. Whitesides, "Poly(dimethylsiloxane) as a material for fabricating microfluidic devices", *Acc. Chem. Res.*, 35(7), 491-498, 2002.

* cited by examiner

ELECTROKINETIC MICRO POWER CELL USING MICROFLUIDIC-CHIP WITH MULTI-CHANNEL TYPE

BACKGROUND OF THE INVENTION

1. Field of the Invention

The present invention relates to a micro power cell with microfluidic-chip that can generate electrical energy by the streaming potential of fluid flowing through microchannels.

2. Description of the Prior Art

When fluid flows through a charged channel by pressure gradient, the density of counter-ions whose charge is opposite to that of the wall surface becomes higher near the surface of the channel wall, resulting in an establishment of the electric double layer (so-called Debye layer). The counter-ions in the electric double layer generate the streaming current by the flow to the direction of pressure gradient. Due to the potential difference causing by distribution gradient between the co-ions and the counter-ions, the streaming potential generates between upstream and downstream of the channel. Since the counter-ions are accumulated in the downstream, the counter-ions move to the opposite direction of the pressure gradient (i.e., the opposite direction of the fluids flow) by the back diffusion effect, and thus conduction currents are induced. Note that the summation of the streaming current and the conduction current is zero at steady state, meaning the conservation of net current in the channel.

When electrolyte solution prepared with arbitrary ionic concentration (i.e., the ionic strength) flows inside the straight cylindrical channel having a well-defined circular cross-section, the relationship between the zeta potential $\zeta$ and the streaming potential E is given by equation 1 referred to as Helmholtz-Smoluchowski (H-S) equation.

$$\frac{\Delta E}{\Delta P} = \frac{\varepsilon_o \varepsilon_r \zeta}{\eta \lambda_o} \qquad \text{[Equation 1]}$$

wherein

E denotes the potential induced by the electrokinetic effect, i.e., the streaming potential, $\Delta P$ denotes the pressure difference exerted between both ends of the channel, $\varepsilon_o$ denotes the dielectric constant at vacuum or vacuum permittivity, $\varepsilon_r$ denotes the relative permittivity of the electrolyte solution, $\lambda_o$ denotes the electric conductivity of the electrolyte solution, and $\eta$ denotes the viscosity of the electrolyte solution.

For either high ionic concentration of electrolyte solution or low surface potential, the zeta potential obtained by measurements fairly agrees with that estimated by equation 1.

Many researchers have tried to understand the electrokinetic phenomena, and to analyze the fluid flowing in the microchannel with diameter less than several hundreds micrometers and the streaming potential according to it.

About 40 years ago, Rice and Whitehead addressed a correction factor from the analytic solution of Poisson-Boltzmann (P-B) equation that should be applied to the case of using the H-S equation (i.e., equation 1) in the paper [C. L. Rice, R. Whitehead, "Electrokinetic flow in a narrow cylindrical capillary", *J. Phys. Chem.*, 69, 4017-4024, 1965].

However, above research is limited to the 1:1 type electrolyte solution with low surface potential because the Debye-Hückel approximation is applied.

Levine et al. presented an analytic solution of the P-B equation that is applicable to monovalent symmetric electrolyte solution with same mobilities for full range of the surface potential in the paper [S. Levine, J. R. Marriott, G. Neale, N. Epstein, "Theory of electrokinetic flow in fine cylindrical capillaries at high zeta-potentials", *J. Colloid Interface Sci.*, 52, 136-149, 1975].

The streaming potential, which is an opposite mechanism to the electro-osmosis, is one of the electrokinetic phenomena. The streaming potential has been considered as a useful method for determining the unknown zeta potential, corresponding to the surface potential of charged material. From studies on the porous membrane filtration disclosed in Causserand et al.'s paper [C. Causserand, M. Nyström, P. Aimar, "Study of streaming potentials of clean and fouled ultrafiltration membranes", *J. Membr. Sci.* 88, 211-222, 1994] and Szymczyk et al.'s paper [A. Szymczyk, B. Aoubiza, P. Fievet, J. Pagetti, "Electrokinetic phenomena in homogeneous cylindrical pores", *J. Colloid Interface Sci.* 216, 285-296, 1999], it can be known that the measurement of electrokinetic streaming potential effectively contributes to the charge characterization of the pore and the surface of porous material.

As disclosed in Sung et al.'s paper [J. H. Sung, M.-S. Chun, H. J. Choi, "On the behavior of electrokinetic streaming potential during protein filtration with fully and partially retentive nanopores", *J. Colloid Interface Sci.* 264, 195-202, 2003], or Chun et al.'s U.S. Patent [M.-S. Chun, J.-J. Kim, S.-Y. Lee, "Equipment and method of local streaming potential measurement for monitoring the process of membrane fouling in hollow-fiber membrane filtration", U.S. Pat. No. 6,277,099 B2, 2004], important information about the colloidal particle deposition onto the surface of the porous membrane can be obtained by monitoring the dynamic behavior of electrokinetic streaming potentials with time progress.

The physical meaning of above equation 1 is that when the electrolyte solution flows in a charged channel with a pressure gradient $\Delta P$, the potential difference $\Delta E$ occurs between the ends of the channel. Accordingly, connecting the external circuit applied appropriate resistance provides the electrical energy encountered by electric current and potential. Recently, a research on the possibility of the streaming potential generated by the electrokinetic principle to the energy source has been presented. In the Daniel Kwok's paper [J. Yang, F. L. Larry, W. Kostiuk, D. Y. Kwok, "Electrokinetic microchannel battery by means of electrokinetic and microfluidic phenomena", *J. Micromech. Microeng.*, 13, 963-970, 2003], when the tap water flows by the pressure difference in a microporous glass filter (diameter 2 cm, thickness 3 mm, Schott-Duran, Mainz) structured with disordered pores with pore size of 10~16 μm and maximum porosity of 60%, it was reported that the maximum value of the streaming potential of 10V and the maximum current of a few μA could be obtained.

However, a power cell relevant to streaming potential that could apply to the practical operation has not been developed until now.

Both the MEMS process and micromachining technologies allow us to fabricate microchannels with desired channel dimension. Using the lab-on-a-chip technique based on these technologies, the micro total analysis system (μ-TAS) as well as the high throughput system (HTS) can be realized. As shown in the research of Shoji and Esashi [S. Shoji, M. Esashi, "Microflow devices and systems" *J. Micromech. Microeng.*, 4, 157-171, 1994], the early researchers from 1980s to the middle of 1990s mainly developed the microfluidic devices by means of the silicon-based micromachining.

As the instruments in the semiconductor industry have advanced, the paradigm of the fabrication technology regarding microfluidic devices has also been changed. After the middle of 1990s, micromachining technology for the disposable plastic materials that are easily replicable in mass has been developed. The master mold for replication can be made by the traditional silicon-based micromachining technology. Like the study of Jo et al. [B.-H. Jo, L. M. van Lerberghe, K. M. Motsegood, D. J. Beebe, "Three-dimensional microchannel fabrication in polydimethylsiloxane (PDMS) elastomer", *J. Microelectromech. Sys.*, 9(1), 76-81, 2000], a method using photoresist SU8 and polydimethylsiloxane (PDMS) is widely known as a simple and low-cost technology.

Since PDMS is indeed inert and transparent in the range of visible or near UV lights, it has merits as a material for microfluidic device. To make the microchannel, a master mold conforming to the microchannel shape is formed on the silicon wafer. Liquid PDMS prepolymer is poured over the mold, and then cure it. Subsequently, the PDMS replica is peeled from the master, and the replica is sealed to a glass coverslip to enclose the channels.

As disclosed in the study of McDonald and Whitesides [J. C. McDonald, G. M. Whitesides, "Poly(dimethylsiloxane) as a material for fabricating microfluidic devices", *Acc. Chem. Res.*, 35(7), 491-498, 2002], the above method is easier in process and lower in cost than the conventional method of etching the glass or silicon wafer in view of mass production of microfluidic-chip.

SUMMARY OF THE INVENTION

The invention is presented to access the streaming potential on an electric power source. The electrokinetic phenomena lead to a generation of streaming potential when the electrolyte solution flows in microchannels, by which an electrokinetic micro power cell can be implemented. In the preparation of the streaming potential cell, microfluidic-chip device is designed and fabricated with multi-channel type by means of the MEMS process and micromachining based on the replica molding (REM).

An electrokinetic micro power cell according to the present invention can efficiently get electrical energy, since the streaming potential and current have been evidently generated in maximum.

Therefore, the object of the invention is to provide a micro power cell using microfluidic-chip with multi-channel type that can generate electrical energy from the streaming potential of fluid flowing in microchannels.

The invention relates to a microfluidic-chip, wherein multi-channel is designed to generate the electrical energy by the streaming potential as well as a micro power cell using the microfluidic-chip.

The microfluidic-chip according to the invention comprises:

an inflow port wherein fluid is introduced, a distributor, which is located between the inflow port and the multi-channel, having the supplied fluid through the inflow port flow in the multi-channel, a multi-channel, wherein each of microchannels is arranged in parallel with each other, and wherein an electric potential difference occurs between both ends of an inlet and an outlet of the microchannel by the streaming potential when the fluid flows through the microchannel, a collector collecting fluid that flows out through the multi-channel, an outflow port flowing out the fluid from the collector, and a pair of electrodes respectively positioned in the distributor and in the collector, which can connect to the external circuit.

Preferably, in the invention, the inflow port is located at the inlet side of the microchannel located in the one side of the multi-channel, and the outflow port is located at the outlet side of the microchannel located in the other side of the multi-channel.

It is preferable that the distributor and the collector take a trapezoidal shape. In other words, the cross-sectional area of the distributor decreases from the one side located the inflow port to the other side. Further, the cross-sectional area of the collector also decreases from the one side located the outflow port to the other side.

In the invention, the microchannel width forms in about 10 to 200 µm, preferably 20 to 100 µm. The microchannel depth forms in about 10 to 200 µm, preferably 50 to 100 µm. The microchannel length forms in about 500 µm to 1 cm, preferably 1 mm to 3 mm.

The spacing between microchannels forms in about 10 to 200 µm, preferably 50 to 200 µm that is similar to the microchannel depth.

In the microfluidic-chip according to the invention, the number of microchannels forms in about 20 to 200, preferably 50 to 150.

The microfluidic-chip according to the invention comprises an upper substrate and a lower substrate. The upper substrate comprises:

the distributor, the multi-channel, and the collector which form in a given height from the bottom surface in order that the fluid can flow; and the inflow port and the outflow port connecting with the distributor and the collector, respectively.

As the upper substrate, a transparent plastic, such as PDMS may be used. As the lower substrate, a glass coverslip may be used.

Electrodes are located at the distributor and the collector. It is preferable that holes for extending the electrodes to the external circuit at the distributor, and holes for extending the electrode to the external circuit at the collector are formed in the upper substrate.

A fabrication method of microfluidic-chip according to the invention comprises steps of:

depositing photoresist on the silicon wafer;

forming a mask pattern, and then patterning by exposing the photoresist deposited on the wafer to the UV light through the mask pattern;

fabricating a master mold by developing the wafer;

molding PDMS on the master mold, and then peeling it from the master mold;

ultrasonic washing the PDMS and glass coverslip, and then sealing the PDMS with the glass coverslip by reactive ion etching (RIE); and inserting the electrodes into the distributor as well as the collector of the PDMS.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the micro power cell according to the invention is concretely explained by reference of drawings. But, the invention is not confined by the bellow embodiments.

Embodiment 1

Figure 1:
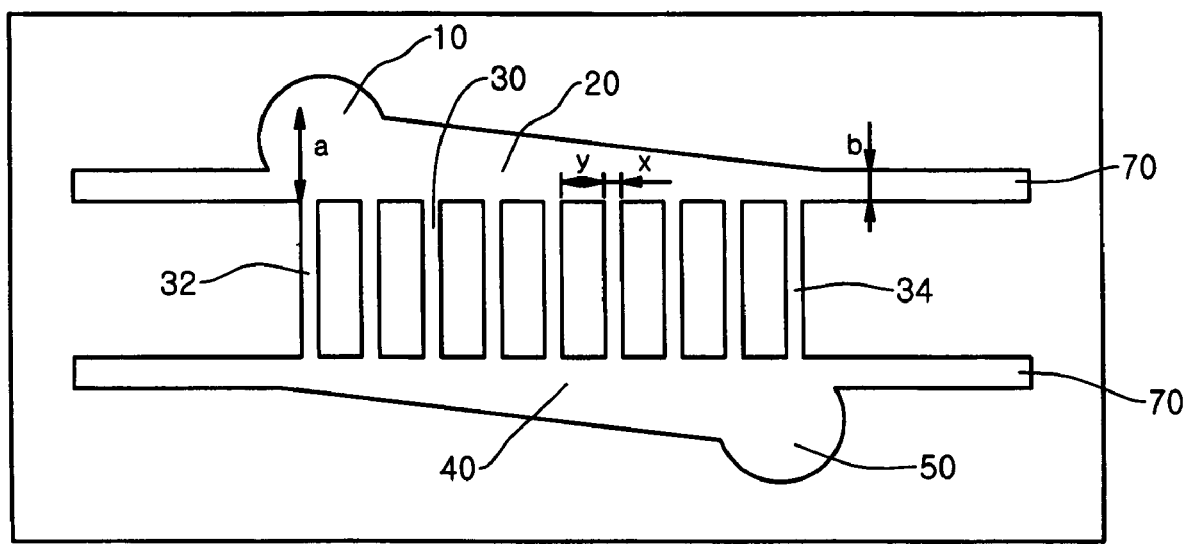
FIG. 1 depicts a layout of photomask for fabricating a microfluidic-chip with multi-channel type.

Fabrication of Master Mold for Making a Microfluidic-Chip Device with a Multi-Channel Type According to the Invention FIG. 1 depicts a photomask drawing designed by AutoCAD® 2002 as a first step for making the microfluidic-chip according to the invention. The chip includes the inflow port 10, the distributor 20, the multi-channel 30, the collector 40, and the outflow port 50.

In the distributor 20 and the collector 40, Ag/AgCl electrodes should be inserted. Therefore, the distributor 20 and the collector 40 should be formed in the depth enough to place the electrodes in them. Similarly, the multi-channel 30 consisting of 100 microchannels should be formed to the same depth as the distributor 20 and the collector 40. Because the diameter of conventional electrodes has about 100 μm, it is optimum to form the microchannel depth to be about 100 μm.

The diameter of the inflow port 10 into which fluid flows and the outflow port 50 from which fluid flows out may be determined to properly connect the inflow port 10 and the outflow port 50 to external tubes. In the embodiment, external tubes have 1/16 inch diameter, the diameter of the inflow port 10 and the outflow port 50 is set in 1.6 mm.

In order to place the electrodes at the input side as well as the output side of the multi-channel, the electrode insertion space 70 is formed. The width of the electrode insertion space is designed to be suitable to insert the electrode therein, which is set to be 300 μm in this embodiment. As the inserted electrode in this embodiment is an Ag wire in 100 μm diameter and its surface is coated with AgCl, 200% space margin to the diameter of the Ag wire is reserved.

The distributor 20 having the fluid supplied through the inflow port 10 flow uniformly into the multi-channel, and the 40 collecting the fluid flowed out from the multi-channel preferably take a trapezoidal shape. The cross-sectional area of the distributor 20 decreases from the one side 32 located the inflow port to the opposite side 34. Also, the cross-sectional area of the collector 40 decreases from the one side 34 located the outflow port to the opposite side 32.

In case of being designed as such, when the fluid flows through 100 of the microchannels, the fluid can almost simultaneously flow out from the outlet of the multi-channel as described above. If the distributor is designed in a uniform width as the rectangular shape, the fluid flowing into the microchannel 32 located at the side where the inflow port 20 exists flows possibly out to the collector 40 before the fluid flows into the microchannel 34 located at the opposite side. In this case, the electrical energy will not regularly generate since the electric potential difference decreases extremely.

In the distributor 20 and the collector 40 taking a trapezoidal shape, the decreasing rate of the width r is estimated depending on the total length L determined by the channel width x, the spacing between microchannels y, and the number of microchannels N. When the length of longer-side and that of shorter-side in the trapezoid denote a and b respectively, the decreasing rate of the width r is defined by equation 2.

$$r \equiv \frac{a-b}{L} = \frac{a-b}{Nx + (N-1)y} \qquad [\text{Equation 2}]$$

In the mask design according to this embodiment, parameters are as follows: the length of longer-side a is 800 μm, the length of shorter-side b is 300 μm, the channel width x is 20 μm, the spacing between microchannels is 100 μm, and the number of channels is 100. In this case, the decreasing rate r of the width is 0.042.

Figure 2:
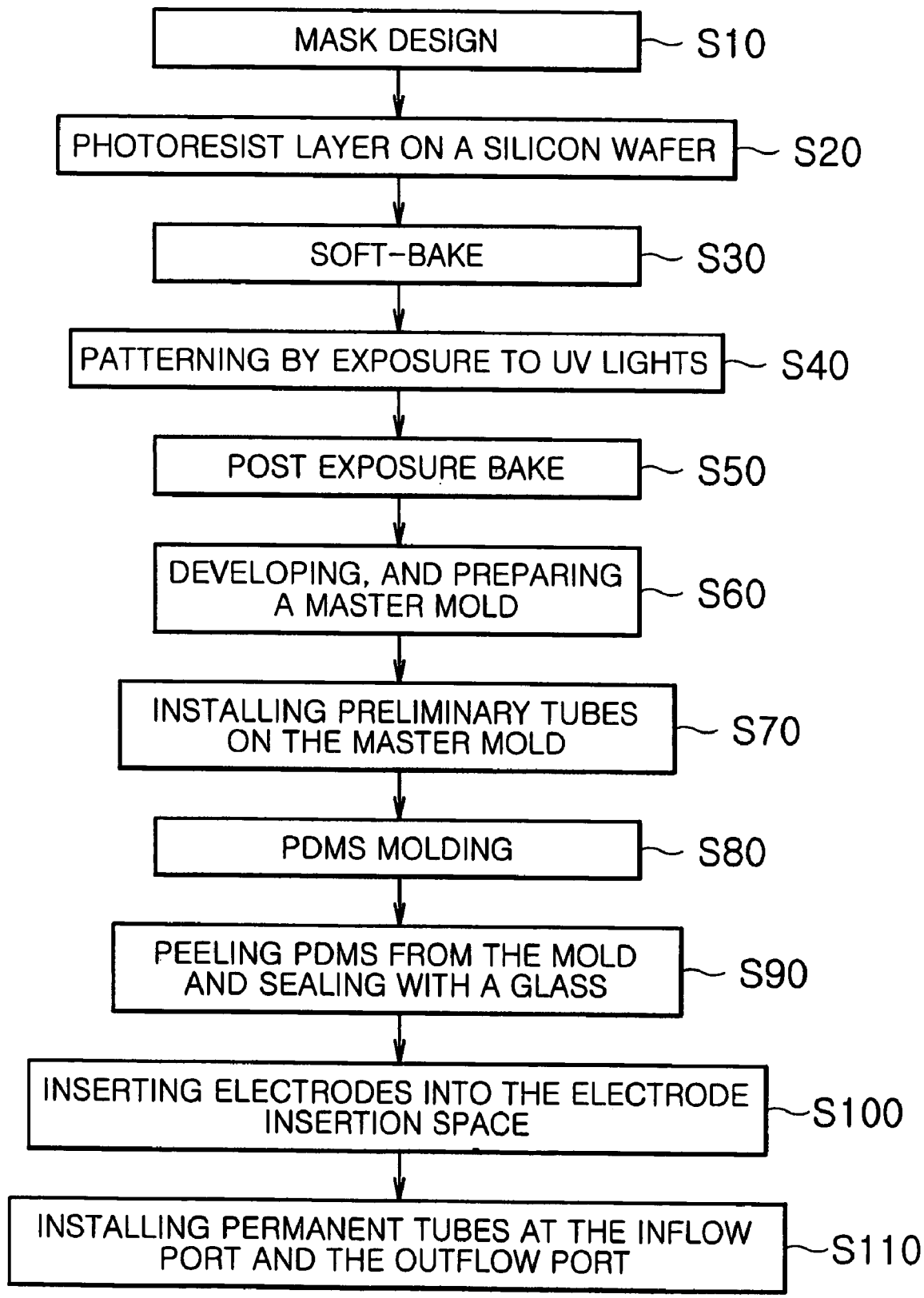
FIG. 2 depicts a process flowchart for fabricating the microfluidic-chip with multi-channel type.

FIG. 2 depicts a process flowchart for fabricating the microfluidic-chip with multi-channel type. FIG. 3a through FIG. 3e depict cross-sectional views for fabricating the microfluidic-chip.

At first, the mask is designed as explained above (S10, FIG. 1).

The surface of silicon wafer is washed with piranha solution made by mixing $H_2SO_4$ and $H_2O_2$ in the ratio of 1:4. Then, a photoresist SU8-50 (MicroChem Co., MA) 200 is layered on the silicon wafer 100 by spin coating (S20, FIG. 3a). As described above, in order that the microchannel depth is to be 100 μm, the photoresist is accumulated 100 μm in thickness. The coating thickness varies depending on the revolution rate of spin coating. SU8-50 spreads out uniformly on the wafer with revolution 500 rpm for 10 seconds, and then, with acceleration 300 rpm/sec and revolution 1000 rpm for 30 seconds to take the thickness of 100 μm.

Then, the coated wafer is soft-baked on a hot plate for 10 minutes at 65° C., and for 30 minutes at 95° C. (S30). As the photoresist SU8-50 is sensitive to heat, therefore, temperature is raised slowly from the room temperature to 65° C. and 95° C. without abrupt heating.

The soft-baked wafer is patterned by exposing to i-line (365 nm wavelength of UV range) with MA6 mask aligner (S40). When it is exposed for 60 seconds in the energy density of 17 mW/cm² through the photomask fabricated in the step of S10, the photoresist exposed to lights is cross-linked.

The exposed SU8-50 is fixed more tightly on the wafer 100 through the post exposure baking (S50).

Figure 3A:
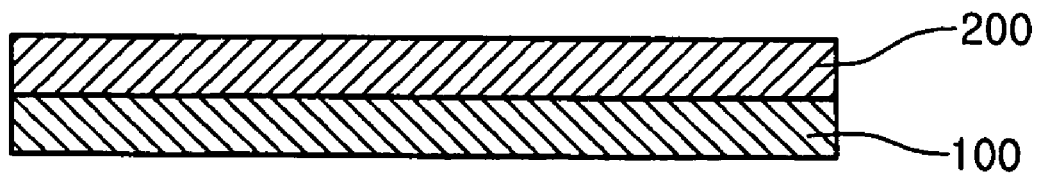
FIG. 3a through FIG. 3e depict cross-sectional views for fabricating the microfluidic-chip with multi-channel type.
Figure 3B:
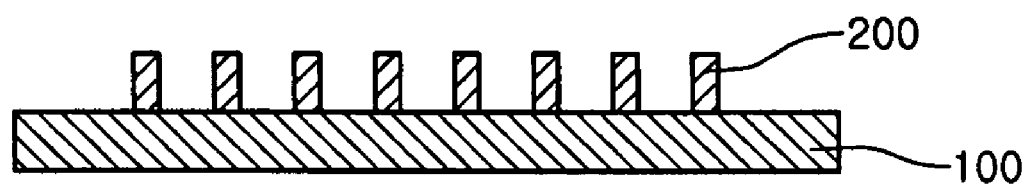

Then, through the developing procedure by agitating with a magnetic bar, a portion of SU8-50 200 not exposed to the lights is eliminated by melting in the developer to form the master mold (S60, FIG. 3*b*). Soaking for too much time provides undesirable separations of any portion of SU8-50 200 exposed to the lights from the wafer. Therefore, attention is needed in this step.

Figure 6:
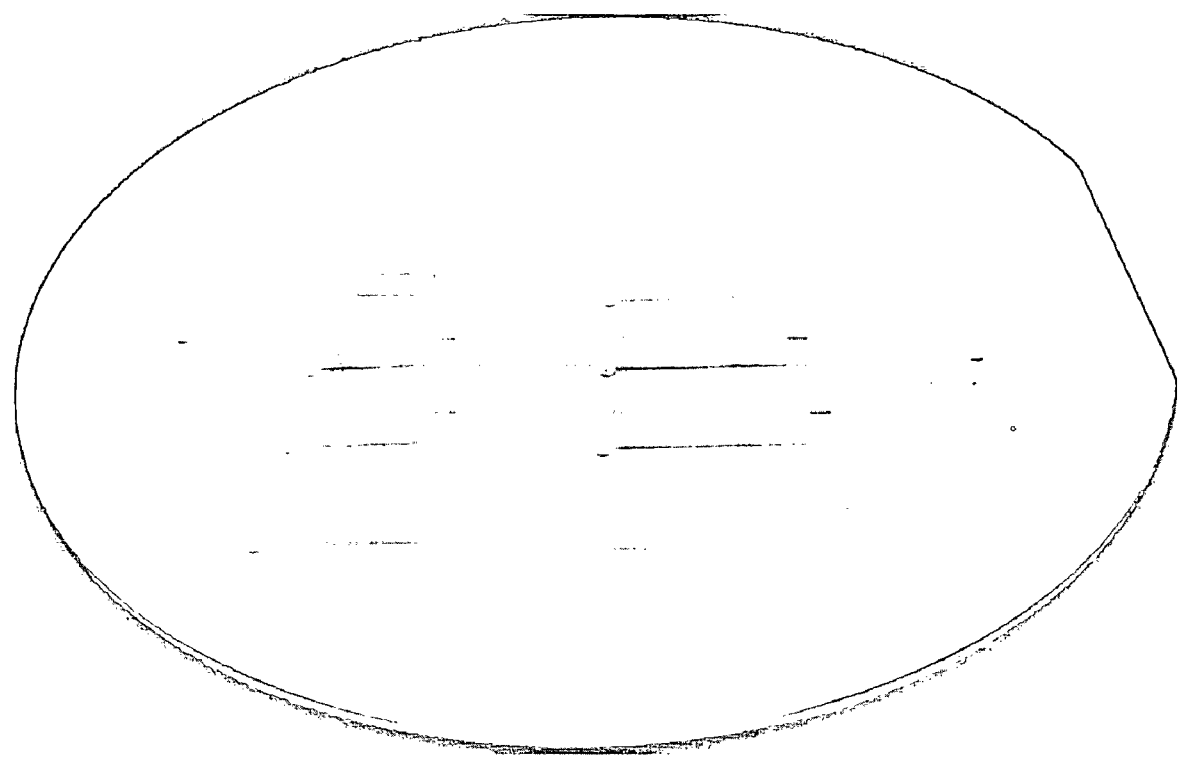
FIG. 6 depicts a picture of a master mold used in fabricating the PDMS-Glass microfluidic-chip with various sizes of channel width, channel length and spacing between channels.

FIG. 6 depicts a picture of the fabricated master mold. The photoresist SU8-50 is patterned in 100 µm thickness on a silicon wafer with 4 inch diameter. The master mold has been designed variously in dimension and geometry of the microchannel.

In the picture of FIG. 6, the right-half side and the left-half side demonstrate each mold with 100 µm and 50 µm of spacing between microchannels, respectively.

In addition, the upper-half side and the lower-half side demonstrate each mold with 1 mm and 3 mm of microchannel length, respectively. As getting away from the center, the channel width increases to 20 µm, 30 µm, 40 µm, and 50 µm. Both the leftmost and the rightmost in the picture are molds with 100 µm channel width.

Figure 7:
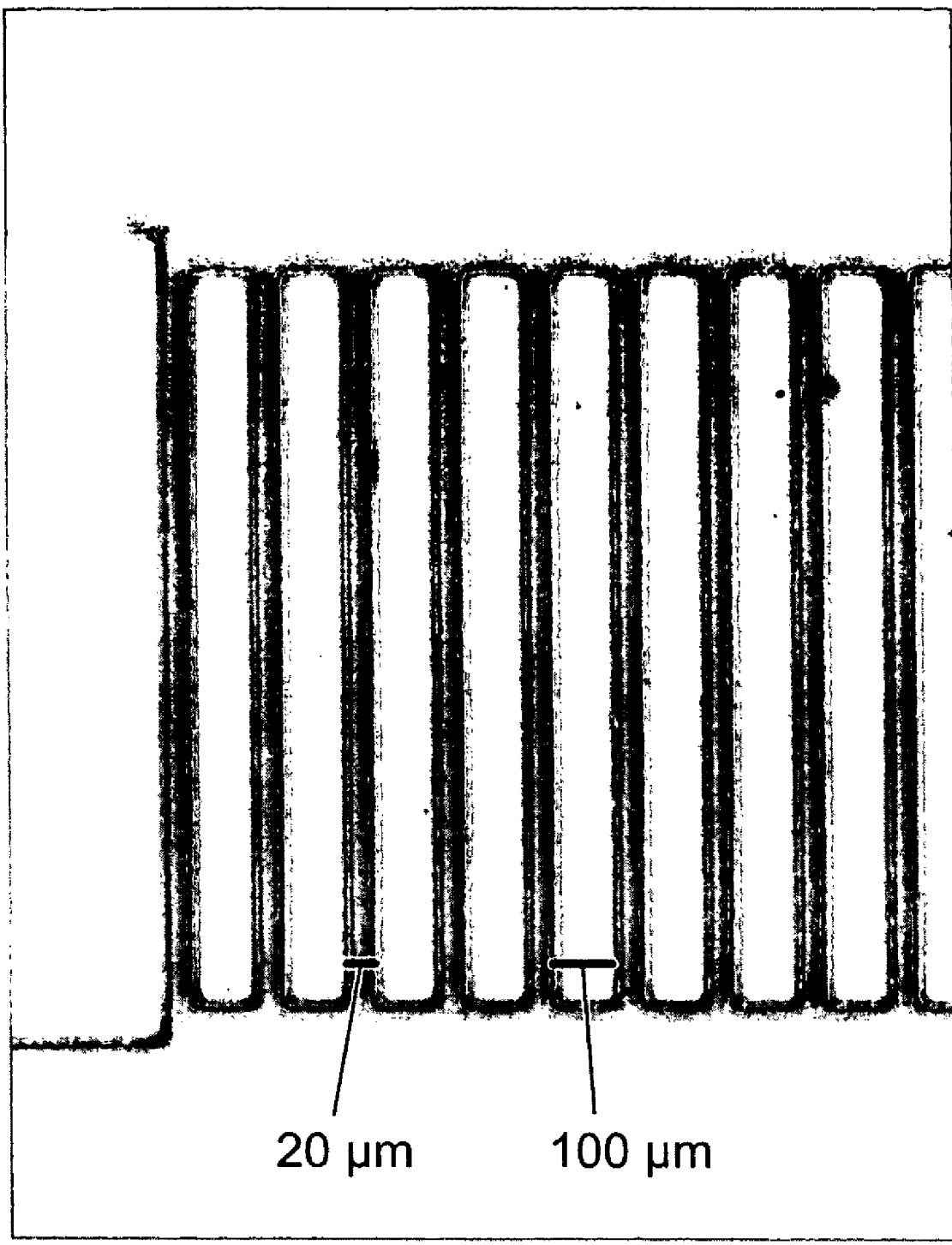
FIG. 7 depicts a micrograph of multi-channel formed in the master mold.

FIG. 7 is a micrograph of microchannels with 20 µm width, 1 mm length, and 100 µm spacing between microchannels, which is taken by microscope with magnifying 20 times of the master mold depicted in FIG. 6.

Figure 3C:
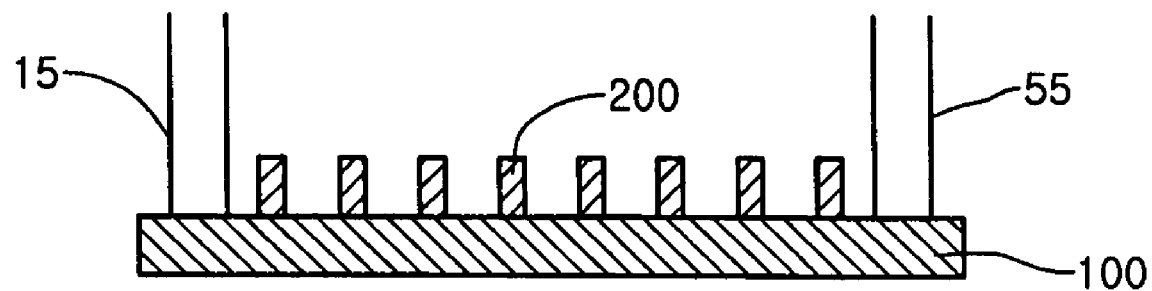
Figure 3D:
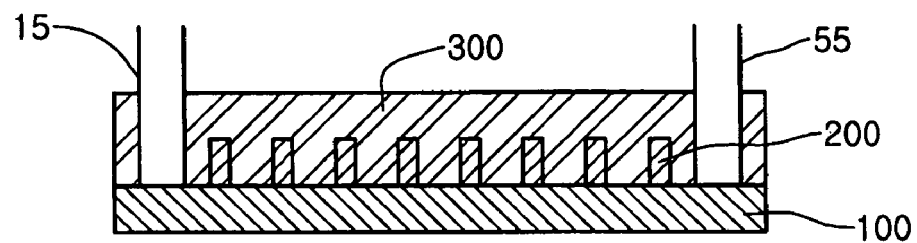

Preliminary tubes 15, 55 with 1/16 inch diameter are weakly adhered to and stand at the corresponding positions of the inflow port 10 and the outflow port 50 in the master mold, respectively (S70, FIG. 3*c*).

PDMS (Sylgard 184 elastomer, Dow Corning Corp., MI) prepolymer is mixed with a curing agent in a ratio of 10:1 by weight, and then the mixture is poured over the master mold. It is degassed in a vacuum oven, where the oven is made vacuum through 3 or 4 steps for 15~20 minutes per each step. When all the air bubbles are eliminated, the master mold with PDMS is heated for 2 hours at 80° C. in a convection oven at the atmospheric pressure, and then, it is cooled slowly at room temperature for about 6 hours to cure PDMS 300 (S80, FIG. 3*d*).

Then, the preliminary tubes are eliminated, and the cured PDMS 300 is peeled from the master mold. The PDMS 300 is washed by ultra-sonication together with the glass coverslip 400 using methanol for 1 hour.

Then, the surface of the PDMS and the glass coverslip that are to be sealed each other is treated with $O_2$ plasma by RF power for 10 seconds. The $O_2$ plasma is set in advance to have 50% of partial pressure using RIE apparatus.

Figure 3E:
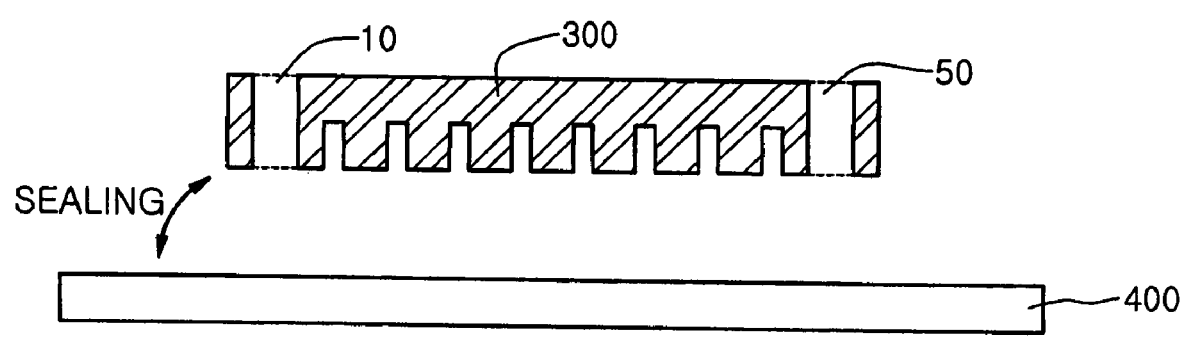

The surface-activated PDMS 300 is adhered to the glass coverslip 400 as quickly as possible to form the microfluidic-chip (S90, FIG. 3*e*). The microfluidic-chip can withstand up to about 5 bar between both ends of the microchannel.

Then, the electrodes 60 are inserted in the electrode insertion space 70 at both ends of microchannels of the chip (S100). After eliminating the preliminary tubes, permanent tubes 150, 151 (FIG. 4*a*) are inserted and fixed by an epoxy resin and an adhesive for silicon rubber (S110).

Figure 4A:
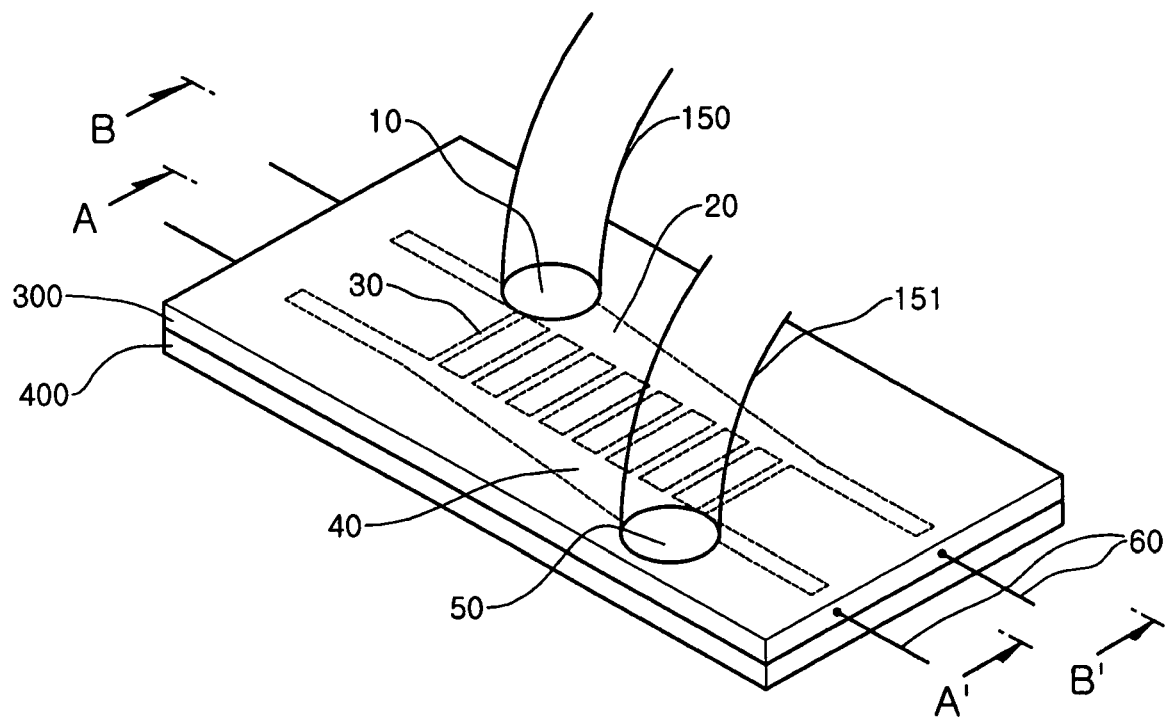
FIG. 4a through FIG. 4c depict a perspective view and cross-sectional views of the microfluidic-chip with multi-channel type.
Figure 4B:
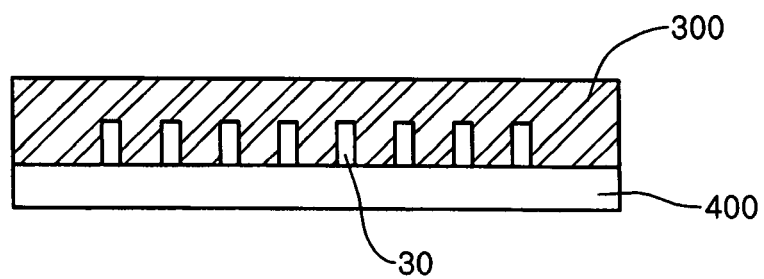
Figure 4C:
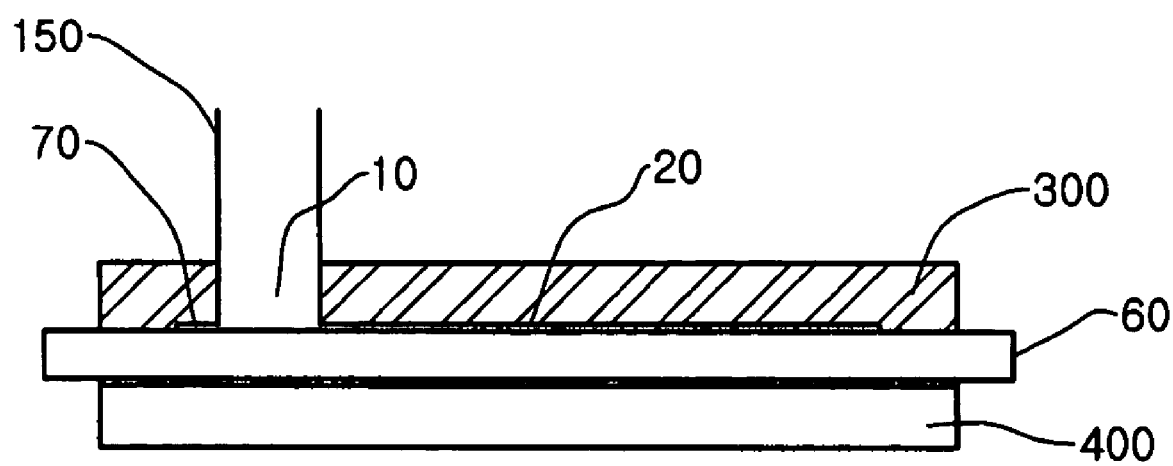

FIG. 4*a* is a perspective view of the microfluidic-chip fabricated by the above method. FIG. 4*b* and FIG. 4*c* depict cross-sectional view taken along with A-A' line and B-B' line in FIG. 4*a*, respectively.

Embodiment 2

Fabrication of a Streaming Potential Cell

Before inserting electrodes, an Ag wire (Aldrich Chemical Co., WI) with 100 µm diameter to use as the electrode is washed in 3M $HNO_3$ solution for 5 minutes. Then, the anode (red color) of a power supply is connected to the Ag wire and the cathode (black color) is connected to a Pt wire in 0.1M HCl solution, and then, 4 mA/cm² of static current is applied for 20 minutes to anodize. AgCl coats the surface of Ag wire, and then an Ag/AgCl electrode can be prepared.

The Ag/AgCl electrodes are inserted into the electrode insertion space 70 of the microfluidic-chip of the invention.

Cutting both ends of the PDMS replica peeled from the master mold gives to form holes at both ends of the electrode insertion space in 300 µm width and 100 µm depth. After that, an electrode is inserted into the hole, and the electrode is protruded outside from both ends of the electrode insertion space. Then, the Ag/AgCl electrode is connected to an external Ag wire in 250 µm diameter by Ag soldering on the PCB. The external Ag wire connects to a digital multi-meter through a connector.

The permanent tubes 150, 151 are installed at the inflow port 10 and the outflow port 50. The electrical energy generated from the chip is available by installing the microfluidic-chip on the PCB.

In a single channel chip, the range of the endurable pressure is relatively high since the PDMS portion sealed with a glass coverslip is large. In the chip with multi-channel, however, spacing between channels should be adjusted to obtain the appropriate endurable pressure.

In the above embodiment, the spacing between microchannels is designed at 100 µm, in which patterning in the UV exposure process could be performed without any problem. However, if the spacing is too small (for example, below 50 µm), the patterning may be performed incompletely.

The portion of the PDMS produced by 100 µm of spacing between channels is activated by the $O_2$ plasma and is to be adhered to the glass coverslip. In order to withstand about 5 bar, this portion of PDMS between channels arranged in parallel each other should be tightly bonded with a glass coverslip. If a channel depth is 100 µm, the spacing between channels may preferably be larger than 100 µm. Therefore, the aspect ratio of the spacing between channels and the channel depth should preferably be designed in 1:1.

Figure 8:
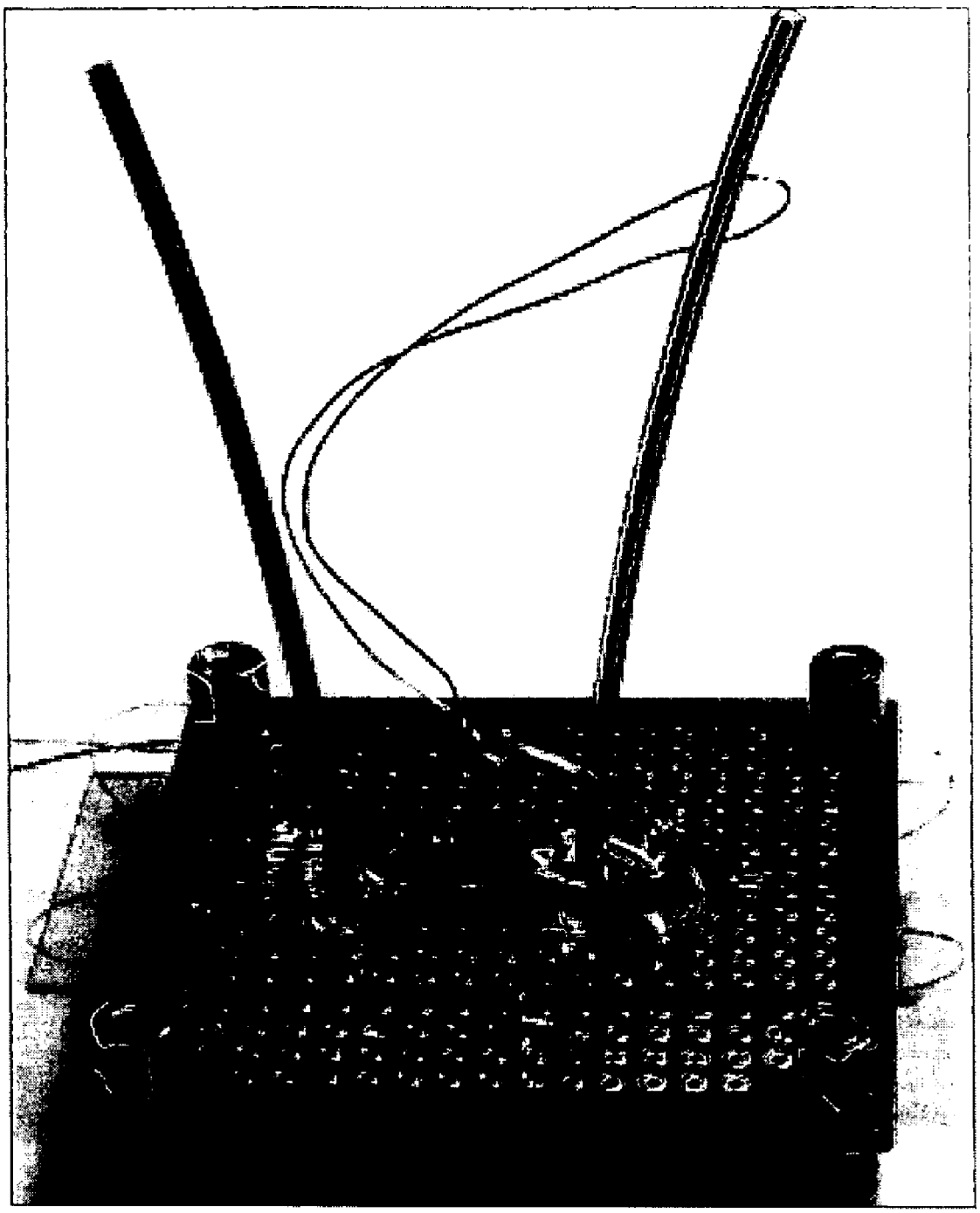
FIG. 8 depicts a picture of the streaming potential cell wherein the microfluidic-chip, in which Ag/AgCl electrodes are inserted, is mounted on the printed circuit board (PCB).

FIG. 8 depicts a streaming potential cell wherein a microfluidic-chip is installed on a PCB. In the microfluidic-chip, external tubes made of polyethylethylketone (PEEK) are inserted by using an epoxy resin and an adhesive, and Ag/AgCl electrodes are inserted and fixed by using an epoxy resin.

Embodiment 3

Figure 5:
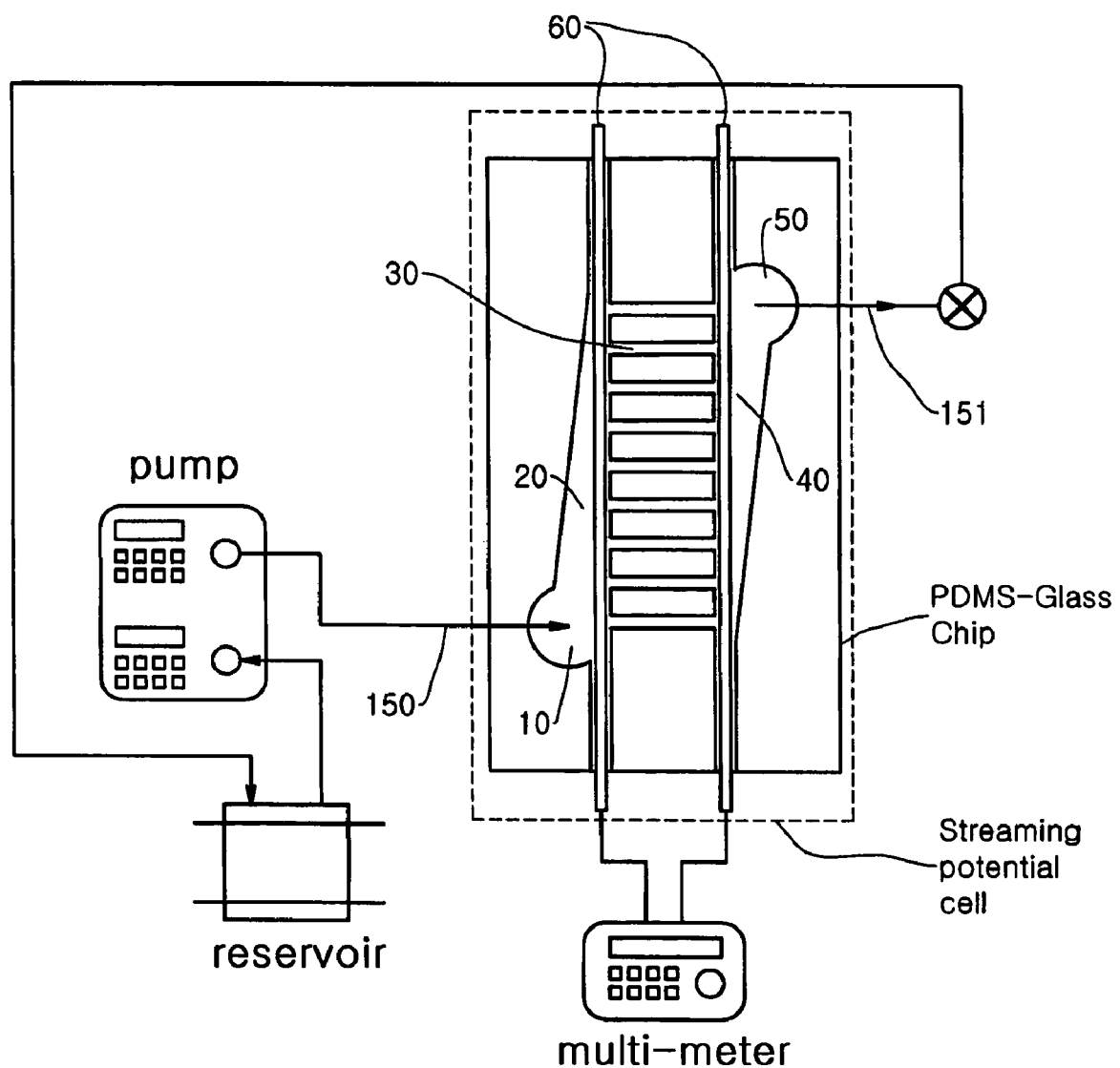
FIG. 5 depicts a system block diagram for an electrokinetic micro power cell according the invention.

Measurement Experiments for Electric Potential with a Micro Power Cell According to the Invention As shown in FIG. 5, a streaming potential cell is comprised in an electrokinetic micro power cell. In FIG. 5, the fluid that is electrolyte solution contained in a reservoir is supplied into the inflow port 10 by a high-precision metering pump (SD- 200, Rainin, Calif.), and it is drained to the outflow port 50 after flowing through the multi-channel 30. The pressure difference ΔP between both ends of microchannels 30 is measured by a precise pressure gauge. The streaming potential difference ΔE between both ends of channels is measured by a digital multi-meter (HP34970A, Hewlett-Packard Co., CA) via the Ag/AgCl electrodes 60 placed respectively at upper and lower parts of the channels. By having electrolyte solution with various ionic concentrations flow, the streaming potential is measured.

Figure 9:
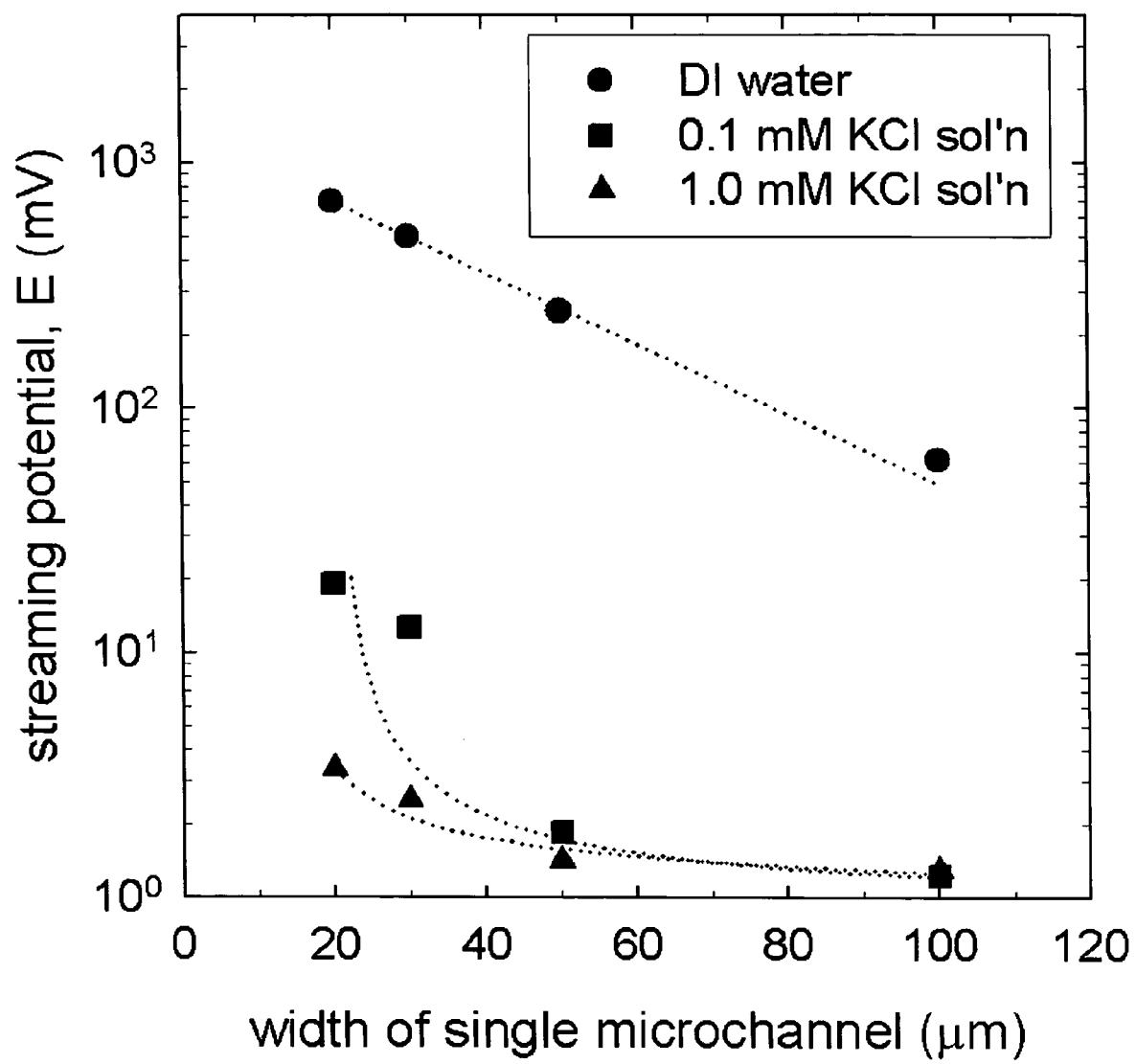
FIG. 9 depicts a result of measuring streaming potentials vs. the channel widths when deionized water, 0.1 mM KCl and 1.0 mM KCl electrolyte solutions flow through the multi-channel of the microfluidic-chip according the invention.

FIG. 9 depicts results of the streaming potential generated depending on the channel width for the deionized water with $10^{-4}$ mM ionic concentration, 0.1 mM and 1.0 mM KCl electrolyte solutions. In the micro power cell according to the invention, the number of microchannels is 100, the spacing between channels is uniformly 100 μm, and the flow rate of the solution is set 10 ml/min.

In the above FIG. 9, in case of the deionized water, the streaming potential is generated up to 700 mV at 20 μm channel width.

Figure 10:
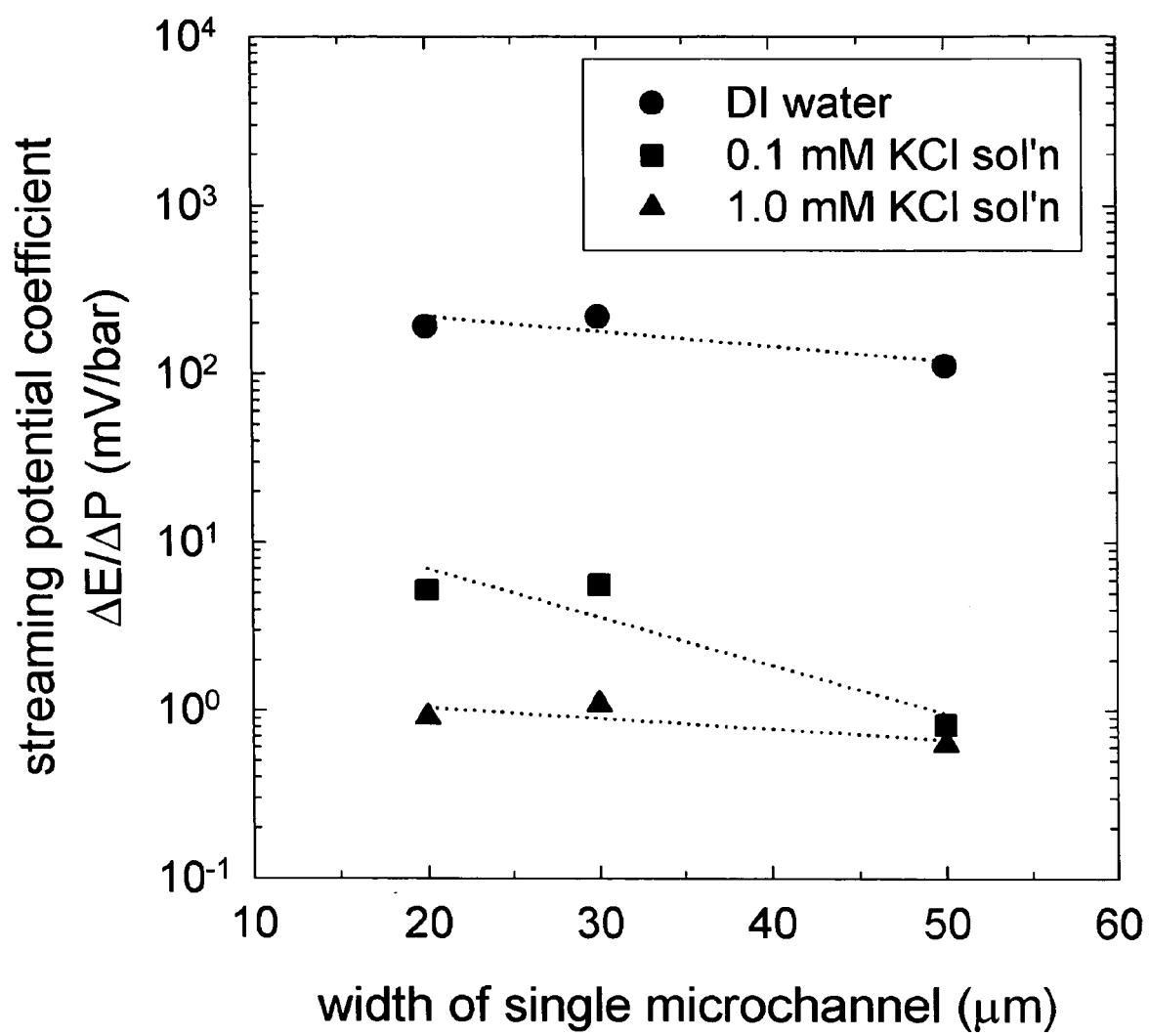
FIG. 10 depicts a result of measuring streaming potential coefficients vs. the channel widths when deionized water, 0.1 mM KCl and 1.0 mM KCl electrolyte solutions flow through the multi-channel of the microfluidic-chip according the invention.

FIG. 10 depicts results of streaming potential coefficients measured by average pressure exerted on both ends of microchannel depending on the channel width for the deionized water, 0.1 mM and 1.0 mM KCl electrolyte solutions. As the channel width increases, the thickness of the electric double layer decreases relatively even in the same ionic concentration. Thus, the value of streaming potential decreases.

Figure 11:
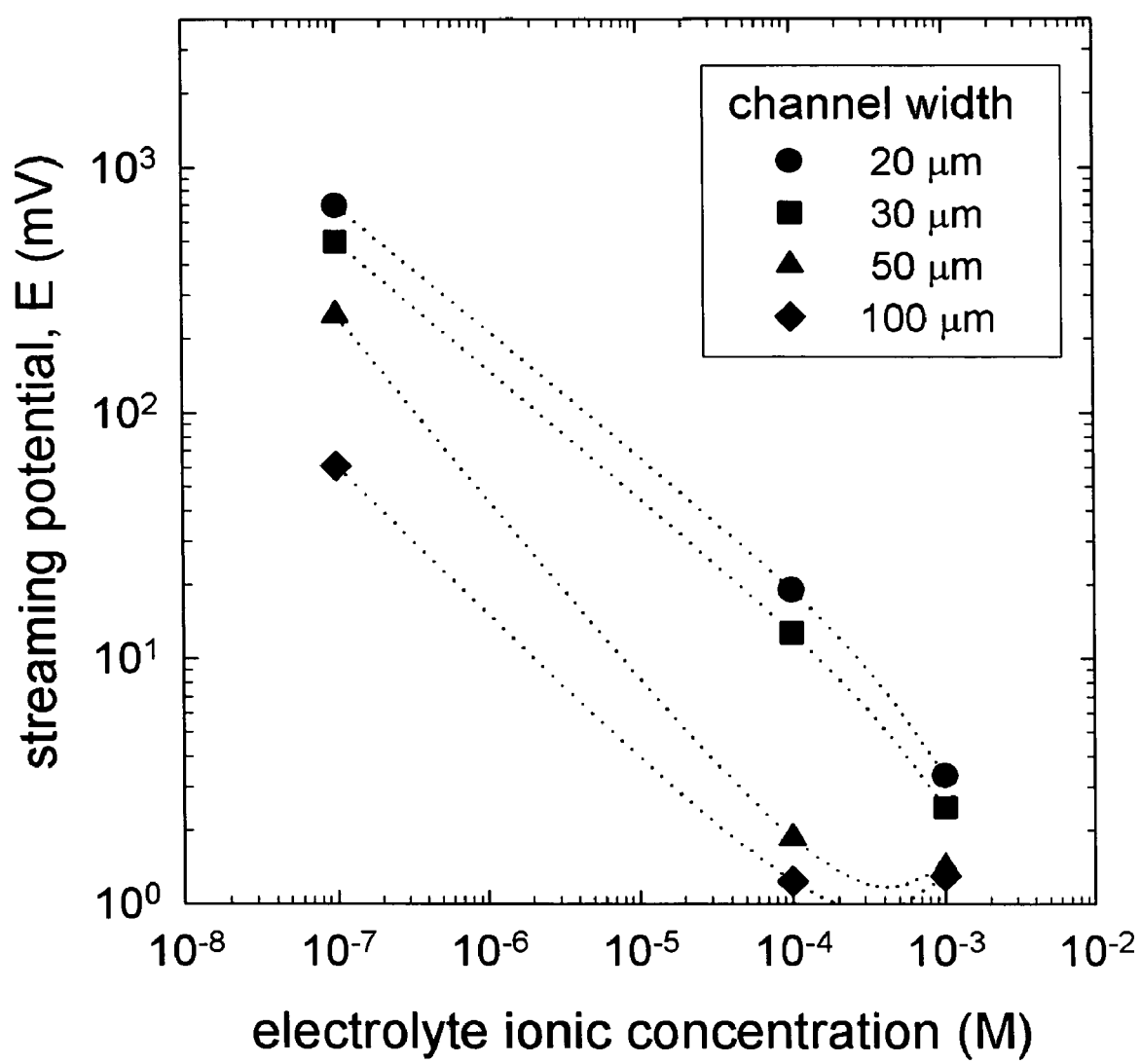
FIG. 11 displays the results of streaming potential measurements for the channel widths of 20 μm, 30 μm, 50 μm, and 100 μm as a function of ionic concentration of the electrolyte solution.

FIG. 11 displays the results of streaming potential depending on the ionic concentration of the electrolyte solution. As depicted in the FIG. 11, as the ionic concentration increases, the thickness of the electric double layer decreases. Therefore, even though channel width is same, the value of streaming potential decreases with increasing the ionic concentration.

The invention relates to an electrokinetic micro power cell applying the microfluidic-chip with multi-channel type, and could be used as a new power source of clean energy.

Especially, since it acts as a power supply or self-power chip, it could be used in electrophoresis, optical experimental facilities, ultra small-scale devices for MEMS process such as micro pump, and for charging small electronic devices such as laptop computer or cell-phone.

What is claimed is:

1. A microfluidic-chip comprising:
   an inflow port wherein fluid is supplied,
   a multi-channel, the multi-channel having a plurality of microchannels arranged in parallel with each other, and wherein electric potentials occur between both ends of an inlet and an outlet of the microchannels by streaming potential when the fluid passes through the microchannels,
   a distributor located between the inflow port and the multi-channel, wherein the distributor uniformly transfers fluid from the inflow port flow into the multi-channel,
   a collector collecting fluid that flows out through the multi-channel,
   an outflow port from which the fluid in the collector flows out, and
   a pair of electrodes, the electrodes positioned respectively in the distributor and in the collector, and which connects to an external circuit in order to use the electric potential, wherein the inflow port is located at the inlet side of the microchannel positioned in the one side of the multi-channel, the outflow port is located at the outlet side of the microchannel positioned in the other side of the multi-channel, and wherein the cross-sectional area of the distributor decreases from the one side located next to the inflow port to the other side, and the cross-sectional area of the collector also decreases from the one side located next to the outflow port to the other side.

2. The microfluidic-chip according to claim 1, wherein the microchannel width is 20 to 100 μm, the microchannel depth is 50 to 100 μm, the microchannel length is 1 to 3 mm, the spacing between microchannels is 50 to 200 μm, and the number of microchannels is 50 to 150.

3. The microfluidic-chip according to claim 1, comprising an upper substrate and a lower substrate, wherein the upper substrate comprises the distributor, the multi-channel, and the collector which are formed in a given height from a bottom surface of the upper substrate in order that the fluid can flow therein; and the inflow port and the outflow port which connect with the distributor and the collector, respectively.

4. The microfluidic-chip according to claim 3, wherein the upper substrate is made of PDMS, and the lower substrate is glass coverslip.

5. The microfluidic-chip according to claim 3, wherein in the upper substrate, a hole for extending one of the electrodes in the distributor to the external circuit, and another hole for extending the other electrode in the collector to the external circuit is formed.

6. An electrokinetic micro power cell, the power cell being of the type that includes a microfluidic-chip having a plurality of microchannels and generating electrical energy due to the streaming potential of fluid flowing through the microchannels, the power cell comprising:
   an inflow port wherein fluid is supplied,
   a multi-channel, wherein each of the microchannels are arranged in parallel with each other, and wherein electric potentials occur between an inlet and an outlet of each of the microchannels by streaming potential when the fluid passes through the microchannels,
   a distributor located between the inflow port and the multi-channel, wherein the distributor uniformly transfers fluid from the inflow port flow into the multi-channel,
   a collector collecting fluid that flows out through the multi-channel,
   an outflow port from which the fluid in the collector flows out, and
   a pair of electrodes, which are positioned respectively in the distributor and in the collector, the electrodes connecting to an external circuit in order to use the electric potential, wherein the inflow port is located at the inlet side of the microchannel positioned in the one side of the multi-channel, the outflow port is located at the outlet side of the microchannel positioned in the other side of the multi-channel, the cross-sectional area of the distributor decreases from the one side located next to the inflow port to the other side, and the cross-sectional area of the collector also decreases from the one side located next to the outflow port to the other side.

7. The electrokinetic micro power cell according to claim 6, wherein the microchannel width is 20 to 100 μm, the microchannel depth is 50 to 100 μm, the microchannel length is 1 to 3 mm, the spacing between microchannels is 50 to 200 μm, and the number of microchannels is 50 to 150.

8. The electrokinetic micro power cell according to claim 6, wherein the microfluidic-chip comprises an upper substrate and a lower substrate, wherein the upper substrate comprises the distributor, the multi-channel, and the collector which are formed in a given height from a bottom surface of the upper substrate in order that the fluid can flow therein; and the inflow port and the outflow port which connect with the distributor and the collector, respectively.

9. The electrokinetic micro power cell according to claim 8, wherein the upper substrate is made of PDMS, and the lower substrate is glass coverslip.

10. The electrokinetic micro power cell according to claim 8, wherein in the upper substrate, a hole for extending one of the electrodes in the distributor to the external circuit, and another hole for extending the other electrode in the collector to the external circuit are formed.

11. The microfluidic-chip according to claim 1, wherein the distributor and the collector take a trapezoidal shape respectively, and a decreasing rate of a width r of each of the distributor and the collector is defined by an equation:

$$r \equiv \frac{a-b}{L} = \frac{a-b}{Nx + (N-1)y}$$

wherein
a and b denote length of longer-side and that of shorter-side in the trapezoid respectively,
x is a width of the microchannel,
y is spacing between the microchannels,
N is the number of the microchannels, and
L is a total length determined by x, y and N.

12. The electrokinetic micro power cell according to claim 6, wherein the distributor and the collector take a trapezoidal shape respectively, and a decreasing rate of a width r of each of the distributor and the collector is defined by an equation:

$$r \equiv \frac{a-b}{L} = \frac{a-b}{Nx + (N-1)y}$$

wherein
a and b denote length of longer-side and that of shorter-side in the trapezoid respectively,
x is a width of the microchannel,
y is spacing between the microchannels,
N is the number of the microchannels, and
L is a total length determined by x, y and N.

* * * * *